UNITED STATES PATENT OFFICE.

BLOOMFIELD J. WHEELOCK, OF NEW YORK, N. Y.

ELECTROLYTE FOR GALVANIC BATTERIES.

SPECIFICATION forming part of Letters Patent No. 385,028, dated June 26, 1888.

Application filed October 28, 1887. Serial No. 253,656. (No specimens.)

*To all whom it may concern:*

Be it known that I, BLOOMFIELD J. WHEELOCK, a citizen of the United States, and a resident of New York, in the county of New York and State of New York, have invented a new and useful Composition of Matter to be Used in Primary Galvanic Batteries, of which the following is a specification.

The object of my invention is to obtain electric energy in primary batteries at reduced cost.

My composition consists of the following ingredients, combined in the proportions stated, viz: nitric acid, (thirty-eight per cent. commercial,) one gallon; sulphuric acid, (specific gravity 1.845,) one gallon; pure water, two gallons; sal-ammoniac, (pure,) four ounces; bichromate of potash or soda, two pounds; sulphate of iron, (pure,) four ounces. These ingredients are to be thoroughly mixed by any convenient means or method, only so that the salts be all dissolved, and in adding the sulphuric acid to the water time sufficient be allowed with agitation to avoid too great heat. The composition should then stand a few hours, when it will be ready for use.

My composition is designed for use in galvanic batteries of the variety known and usually designated as "two-fluid batteries," having in their construction an outer jar of glass or other suitable material and an inner jar or vase made of some porous material, preferably unglazed porcelain. I place in the outer jar the usual zinc element and water, with one part of sulphuric acid added to one hundred parts of water. I use sheet-zinc from one sixteenth to one-eighth of an inch in thickness, and prefer to amalgamate it. In the inner jar I place a conducting-electrode, preferably of carbon, and my composition thus immersing the carbon therein. The battery being set up in the usual way and the jars supplied with the liquids as above stated and the circuit closed, a powerful current will be produced and maintained for a long period of time.

To promote the object of my invention and secure the best results therefrom, I use an inner jar of reduced porosity, those ordinarily obtainable from manufacture being quite too porous, allowing as they do a too free mingling of the composition of the inner jar with that of the outer jar, thus causing waste of material and energy, and causing needless consumption of zinc with injurious local actions, and lessening the efficiency and constancy of the battery. To avoid all these injurious results, which are found in most of the two-liquid batteries now in use, I reduce the porosity of the inner jar, by some of the means now obtainable at slight cost, to such a degree that, being filled with water, not more than about five per cent. of its contents would percolate through its walls in twenty four hours.

While it must be admitted that it is difficult to ascertain precisely what chemical actions take place between the compounds of which my composition consists, yet I have demonstrated by trials and experiments that improved results are obtained in the manner stated. While I generally use and prefer in my composition bichromate of potash, still very satisfactory results can be obtained by using instead thereof bichromate of soda.

Slight variations in the proportions without serious damage may be made. Persons skilled in such matters will understand that the composition can be varied to adapt it to the work to be done or length of time the battery is desired to work. Still I recommend the formula and proportions above given be adhered to as the best for ordinary work and best economy. With my composition in a battery made of materials of such low cost and of so durable a nature, the cheapness of the ingredients of which it is composed and the small amount of labor required for its preparation, and the energy and constancy of the current obtained, the object of my invention is accomplished—namely, the production of electric energy in primary batteries at reduced cost.

I am aware that most possibly all of the ingredients of which my composition consists have been used in various forms of primary batteries; but I am not aware that all the ingredients of my composition in the proportions stated have been used together.

What I claim, and desire to secure by Letters Patent of the United States, is—

1. The herein-described composition of matter to be used in primary batteries, consisting of nitric acid, sulphuric acid, pure water, sal-ammoniac, bichromate of potash or bichromate of soda, and sulphate of iron, substantially as and for the purpose set forth.

2. The combination of carbon and zinc elements with a composition of matter consisting of nitric acid, sulphuric acid, pure water, sal-ammoniac, bichromate of potash or bichromate of soda, and sulphate of iron, substantially as described, and for the purpose set forth.

Signed at New York, in the county of New York and State of New York, this 24th day of October, A. D. 1887.

BLOOMFIELD J. WHEELOCK.

Witnesses:
WALTER V. BLOOMFIELD,
J. W. WHEELOCK.